United States Patent
Benya, Jr. et al.

(10) Patent No.: US 9,252,695 B2
(45) Date of Patent: Feb. 2, 2016

(54) BRUSHLESS PERMANENT MAGNET GENERATOR PLUS AUXILIARY VOLTAGE SOURCE CONSTANT POTENTIAL EXCITER

(71) Applicant: General Electric Company, Schenectady, NY (US)

(72) Inventors: Edward George Benya, Jr., Sugar Land, TX (US); Jametra Frajai Stitt, Houston, TX (US)

(73) Assignee: General Electric Company, Schenectady, NY (US)

( * ) Notice: Subject to any disclaimer, the term of this patent is extended or adjusted under 35 U.S.C. 154(b) by 22 days.

(21) Appl. No.: 14/206,449

(22) Filed: Mar. 12, 2014

(65) Prior Publication Data

US 2015/0263658 A1    Sep. 17, 2015

(51) Int. Cl.
*H02P 9/14* (2006.01)
*H02P 9/30* (2006.01)
*H02P 3/00* (2006.01)

(52) U.S. Cl.
CPC ..................................... *H02P 9/302* (2013.01)

(58) Field of Classification Search
USPC .................................. 322/10, 24, 46; 290/31
See application file for complete search history.

(56) References Cited

U.S. PATENT DOCUMENTS

| | | | | |
|---|---|---|---|---|
| 4,622,629 | A | | 11/1986 | Glennon ......................... 363/70 |
| 4,743,777 | A | * | 5/1988 | Shilling et al. .................. 290/46 |
| 4,959,605 | A | * | 9/1990 | Vaidya et al. ................... 322/10 |
| 5,013,929 | A | * | 5/1991 | Dhyanchand ................... 290/31 |
| 5,015,941 | A | * | 5/1991 | Dhyanchand ................... 322/10 |
| 5,363,032 | A | * | 11/1994 | Hanson et al. .................. 322/10 |
| 5,387,859 | A | * | 2/1995 | Murugan et al. ............... 322/10 |
| 5,461,293 | A | * | 10/1995 | Rozman et al. ............... 318/603 |
| 5,493,200 | A | * | 2/1996 | Rozman et al. ................ 322/10 |
| 5,495,162 | A | * | 2/1996 | Rozman et al. ................ 322/10 |
| 5,495,163 | A | * | 2/1996 | Rozman et al. ................ 322/10 |
| 5,546,742 | A | * | 8/1996 | Shekhawat et al. ............ 60/788 |
| 5,581,168 | A | * | 12/1996 | Rozman et al. ............... 318/723 |
| 5,594,322 | A | * | 1/1997 | Rozman et al. ................ 322/10 |
| 5,747,971 | A | * | 5/1998 | Rozman et al. ................ 322/10 |
| 5,764,036 | A | * | 6/1998 | Vaidya et al. .................. 322/90 |
| 5,977,648 | A | | 11/1999 | Seffernick et al. ............. 290/43 |

(Continued)

FOREIGN PATENT DOCUMENTS

| | | |
|---|---|---|
| EP | 1746716 A2 | 1/2007 |
| EP | 1959555 A1 | 8/2008 |

(Continued)

OTHER PUBLICATIONS

PCT Search Report and Written Opinion issued in connection with corresponding PCT Application No. PCT/US2015/019871 on May 28, 2015.

*Primary Examiner* — Pedro J Cuevas
(74) *Attorney, Agent, or Firm* — Fletcher Yoder, P.C.

(57) ABSTRACT

An alternating current power generation system including an alternating current generator comprising an exciter, a brushless permanent magnet generator voltage source configured to generate a first voltage at a first frequency, a second voltage source configured to generate a second voltage at a second frequency, and a coil. Further, the brushless permanent magnet generator voltage source provides the first voltage as a supplemental voltage supply combined with the second voltage source at the coil to generate a constant exciter field received by the exciter of the alternating current generator.

20 Claims, 3 Drawing Sheets

(56) References Cited

U.S. PATENT DOCUMENTS

| | | | |
|---|---|---|---|
| 6,281,664 B1 * | 8/2001 | Nakamura et al. | 322/22 |
| 6,768,278 B2 * | 7/2004 | Xu et al. | 318/140 |
| 6,838,778 B1 * | 1/2005 | Kandil et al. | 290/31 |
| 6,838,779 B1 * | 1/2005 | Kandil et al. | 290/31 |
| 6,909,262 B2 | 6/2005 | Yao et al. | 322/29 |
| 7,053,590 B2 * | 5/2006 | Wang | 322/24 |
| 7,224,147 B2 | 5/2007 | Shah et al. | 322/46 |
| 7,307,403 B2 * | 12/2007 | Sarlioglu et al. | 322/10 |
| 7,309,974 B2 * | 12/2007 | Sarlioglu et al. | 322/47 |
| 7,355,367 B2 * | 4/2008 | Sarlioglu et al. | 322/47 |
| 7,369,417 B2 * | 5/2008 | Morcov et al. | 363/3 |
| 7,508,086 B2 * | 3/2009 | Huang et al. | 290/31 |
| 7,508,160 B1 * | 3/2009 | Rudniski | 318/801 |
| 7,687,928 B2 * | 3/2010 | Taneja et al. | 290/36 R |
| 7,786,708 B2 * | 8/2010 | Rozman et al. | 322/24 |
| 7,821,145 B2 * | 10/2010 | Huang et al. | 290/31 |
| 8,134,344 B2 | 3/2012 | Hodge | 322/29 |
| 8,148,834 B2 * | 4/2012 | Huang et al. | 290/31 |
| 8,148,866 B2 | 4/2012 | Shah | 310/181 |
| 8,198,872 B2 | 6/2012 | Xu et al. | 322/59 |
| 8,237,416 B2 * | 8/2012 | Rozman et al. | 322/22 |
| 8,275,488 B2 * | 9/2012 | Kim et al. | 700/287 |
| 8,358,111 B2 | 1/2013 | Rozman et al. | 322/46 |
| 8,378,644 B2 | 2/2013 | Said et al. | 322/44 |
| 8,699,251 B2 * | 4/2014 | Rozman et al. | 363/71 |
| 8,912,765 B2 * | 12/2014 | Rozman et al. | 322/24 |
| 8,928,293 B1 * | 1/2015 | Rozman et al. | 322/79 |
| 9,054,610 B2 * | 6/2015 | Rozman | H02P 9/02 1/1 |
| 9,088,230 B2 * | 7/2015 | Rozman | H02P 9/02 1/1 |
| 2007/0222220 A1 * | 9/2007 | Huang et al. | 290/31 |
| 2008/0061747 A1 * | 3/2008 | Sarlioglu et al. | 322/11 |
| 2009/0174188 A1 * | 7/2009 | Huang et al. | 290/46 |
| 2009/0198386 A1 * | 8/2009 | Kim et al. | 700/298 |
| 2012/0126758 A1 | 5/2012 | Fang et al. | 322/29 |
| 2014/0265747 A1 * | 9/2014 | Rozman et al. | 310/68 R |
| 2014/0266076 A1 * | 9/2014 | Rozman et al. | 322/24 |
| 2015/0222123 A1 * | 8/2015 | Manson | H02J 3/46 700/287 |
| 2015/0244303 A1 * | 8/2015 | Gao | F02N 11/04 290/32 |

FOREIGN PATENT DOCUMENTS

| | | |
|---|---|---|
| GB | 849690 A | 9/1960 |
| WO | 8702199 A1 | 4/1987 |

* cited by examiner

US 9,252,695 B2

BRUSHLESS PERMANENT MAGNET GENERATOR PLUS AUXILIARY VOLTAGE SOURCE CONSTANT POTENTIAL EXCITER

BACKGROUND

The subject matter disclosed herein relates generally to the field of electric power generation. More particularly, the subject matter relates to techniques for improving load acceptance characteristics for an alternating current (AC) power generation system.

In the field of electric power generation, a wide range of systems are known and currently available for converting, producing, and applying power to loads. Depending upon the application, AC power generation systems may include circuitry that converts incoming power from one form to another as used by the loads. In a typical AC power generation system, for example, a rectifier converts alternating current (AC) power (such as from a generator) to direct current (DC) power. The DC power can then be applied to a rotating coil to create an exciter field that excites stationary coils of an AC generator producing a controllable AC output.

Traditionally, a permanent magnet generator (PMG) may be used as a power source for the exciter field of the AC power generation system. However, upon receiving a new load on the grid of the AC power generation system, the voltage supplied by the PMG may decay substantially resulting in a slow response time to stabilize the grid. Accordingly, it may be advantageous to develop systems and techniques that allow for the mitigation of and/or elimination of power droop related to PMG decay.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In a first embodiment, an alternating current power generation system includes an alternating current generator including an exciter, a brushless permanent magnet generator voltage source configured to generate a first voltage at a first frequency, a second voltage source configured to generate a second voltage at a second frequency, and a coil, wherein the brushless permanent magnet generator voltage source provides the first voltage as a supplemental voltage supply combined with the second voltage at the coil, to generate a constant exciter field received by the exciter of the alternating current generator.

In a second embodiment, a device includes an automatic voltage regulator, wherein the automatic voltage regulator controls voltage entering a coil of an exciter field, wherein the automatic voltage regulator includes a power converter configured to rectify voltage inputs received from a permanent magnet generator and a second voltage source at differing frequencies, and supply a voltage to a direct current bus. The automatic voltage regulator also includes an automatic voltage regulator controller configured to receive data from an output of an alternating current generator and control application of the voltage at the direct current bus to the coil of the exciter field based on the data received from the output of the alternating current generator.

In a third embodiment, a method for controlling an output of an alternating current generator includes receiving voltage from a brushless permanent magnet generator and a second voltage source at an automatic voltage regulator, wherein the voltage received from the brushless permanent magnet generator comprises a different frequency than the voltage received from the second voltage source, receiving signals indicating a current level and a voltage level of the output of the alternating current generator at the automatic voltage regulator, and controlling an application of the voltage from the brushless permanent magnet generator and the second voltage source at a coil of an exciter field to vary a magnitude of the exciter field, wherein the exciter field excites an alternating current exciter within the alternating current generator, the alternating current exciter controls a generating field of the alternating current generator, and the generating field controls the output of the alternating current generator.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein.

DETAILED DESCRIPTION

One or more specific embodiments of the present subject matter will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements.

The present subject matter involves control of an alternating current (AC) power generating system on an electric grid to compensate for changes of a power output of the AC power generating system upon acceptance of a new load at the grid. A voltage that is applied to a coil of an exciter field of the AC power generating system may determine a rate at which the AC power generating system is capable of responding to the acceptance of the new load. Therefore, it may be advantageous to provide a constant voltage source at the coil of the exciter field to supplement a main power supply of the exciter field. The constant voltage source may boost the voltage applied to the coil and enable the AC power generating system to vary the power output based on accepting the new load at the grid. For example, to improve the response time, a permanent magnet generator (PMG) may provide an auxiliary voltage source with a constant potential in parallel to a second voltage source to compensate for a lagging voltage output of the second voltage source. In this manner, the response time to a load addition may be improved. Additionally, it may be desirable for the PMG voltage output and an output of the second voltage source to each pass through a full-wave bridge rectifier to steer the voltage outputs toward a DC bus coupled to the exciter field, as well as to prevent back-feeding of voltage from one voltage source to the other.

Figure 1:
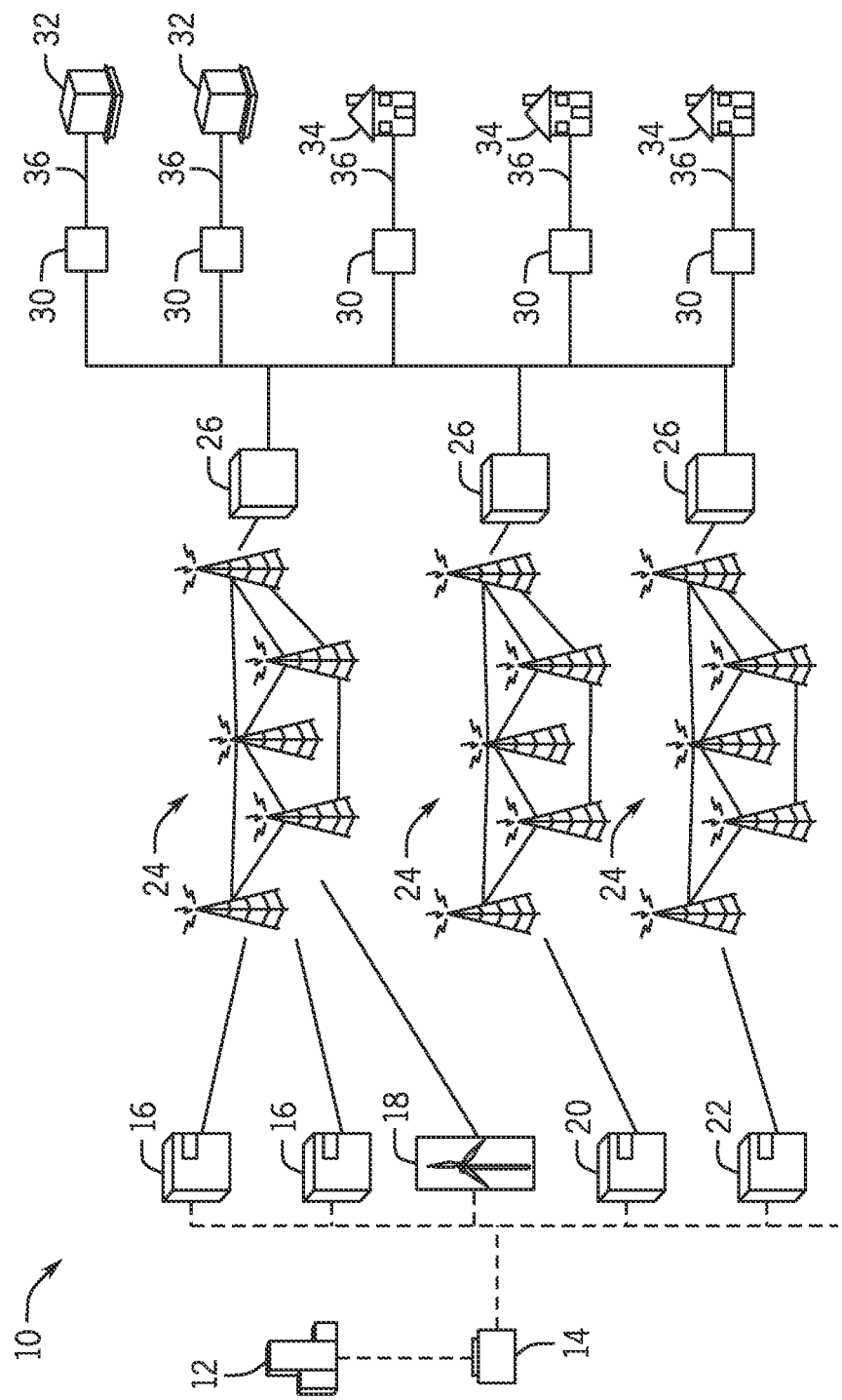
FIG. 1 is a block diagram of an energy generation, transmission, and distribution infrastructure system, in accordance with an embodiment.

With the foregoing in mind, it may be useful to describe an embodiment of an infrastructure, such as an example smart grid system 10 illustrated in FIG. 1. It is to be noted that the systems and methods described herein may apply to a variety of infrastructures, including, but not limited to, power transmission and distribution infrastructures. As depicted, the smart grid system 10 may include one or more utilities 12. The utility 12 may provide for oversight operations of the smart grid system 10. For example, utility control centers 14 may monitor and direct power produced by one or more power generation stations 16 and alternative power generation stations 18. The power generation stations 16 may include conventional power generation stations, such as power generation stations using gas, coal, biomass, and other carbonaceous products for fuel. The alternative power generation stations 18 may include power generation stations using solar power, wind power, hydroelectric power, geothermal power, and other alternative sources of power (e.g., renewable energy) to produce electricity. Other infrastructure components may include a water power producing plant 20 and geothermal power producing plant 22. For example, water power producing plants 20 may provide for hydroelectric power generation, and geothermal power producing plants 22 may provide for geothermal power generation.

The power generated by the power generation stations 16, 18, 20, and 22 may be transmitted through a power transmission grid 24. The power transmission grid 24 may cover a broad geographic region or regions, such as one or more municipalities, states, or countries. The transmission grid 24 may also be a single phase alternating current (AC) system, but most generally may be a three-phase AC current system. As depicted, the power transmission grid 24 may include a series of towers to support a series of overhead electrical conductors in various configurations. For example, extreme high voltage (EHV) conductors may be arranged in a three conductor bundle, having a conductor for each of three phases. The power transmission grid 24 may support nominal system voltages in the ranges of 110 kilovolts (kV) to 765 kilovolts (kV). In the depicted embodiment, the power transmission grid 24 may be electrically coupled to a power distribution substation and grid 26. The power distribution substation and grid 26 may include transformers to transform the voltage of the incoming power from a transmission voltage (e.g., 765 kV, 500 kV, 345 kV, or 138 kV) to primary (e.g., 13.8 kV or 4160V) and secondary (e.g., 480V, 240V, or 120V) distribution voltages. For example, industrial electric power consumers (e.g., production plants) may use a primary distribution voltage of 13.8 kV, while power delivered to commercial and residential consumers may be in the secondary distribution voltage range of 120V to 480V.

As again depicted in FIG. 1, the power transmission grid 24 and power distribution substation and grid 26 may be part of the smart grid system 10. Accordingly, the power transmission grid 24 and power distribution substation 26 may include various digital and automated technologies to control power electronic equipment such as generators, switches, circuit breakers, reclosers, and so forth. The power transmission grid 24 and power distribution substation and grid 26 may also include various communications, monitoring, and recording devices such as, for example, programmable logic controllers (PLCs) and electric fault sensing protective relays. For example, during storms, a protective relay on the grid 26 may detect an electrical fault downstream of the substation, and operate a circuit breaker to allow the fault to clear and restore electric power. In certain embodiments, the power transmission grid 24 and power distribution substation and grid 26 may also deliver power and communicate data such as changes in electric load demand to a metering system 30.

In certain embodiments, the metering system 30 may be an advanced metering infrastructure (AMI) meter used to collect, measure, and analyze electric power usage and/or generation. The metering system 30 may be electrically and communicatively coupled to one or more of the components of the smart grid 10, including the power transmission grids 24, power distribution substation and grid 26, and the commercial sites 32 and residences 34 via source-side and load-side live and neutral conductors 36. Additionally, the metering system 30 may allow two-way communication between commercial sites 32, residences 34, and the utility control center 14, providing for a link between consumer behavior and electric power usage and/or generation. For example, metering system 30 may track and account for pre-paid electricity in a similar fashion to pre-paid cell phone usage. Likewise, the utility's consumers (e.g., commercial sites 32, residences 34) may benefit from lower utility charges by optimizing their utility use, for example, to take advantage of lower rates during low demand hours. Washer/dryers, electric car chargers, and other flexible power consumption appliances may be programmed to operate during low demand hours, resulting in lower utility bills and a more balanced utilization of energy. As noted above, electric power may also be generated by the consumers (e.g., commercial sites 32, residences 34). For example, the consumers may interconnect a distributed generation (DG) resource (e.g., solar panels or wind turbines) to generate and deliver power to the smart grid 10.

As will be further appreciated, in certain embodiments, the metering system 30 may include a system of electrical and electronic components such as, for example, a display, one or more processors, memory and similar storage devices, sensors, tampering detectors, and so forth. It should also be appreciated that the metering system 30 may measure, calculate, store, and display an apparent power (kVA), real power (i.e., the total power consumed by the resistive component of a given load 32, 34 over a time interval) (kW), and reactive power (i.e., the power consumed by the reactive component of a given load 32, 34 over a time interval) (kVar) as a product of power and time. For example, electric utilities may report to consumers their usage and/or generation per kilowatt-hour (kWh) for billing and/or crediting purposes. Such metering systems 30 may contain components that may be sensitive to overvoltage events occurring in the power transmission grid 24. As such, a method to protect the electrical and electric components of the metering systems 30 may be helpful to limit replacement costs upon the occurrence an overvoltage event.

Figure 2:
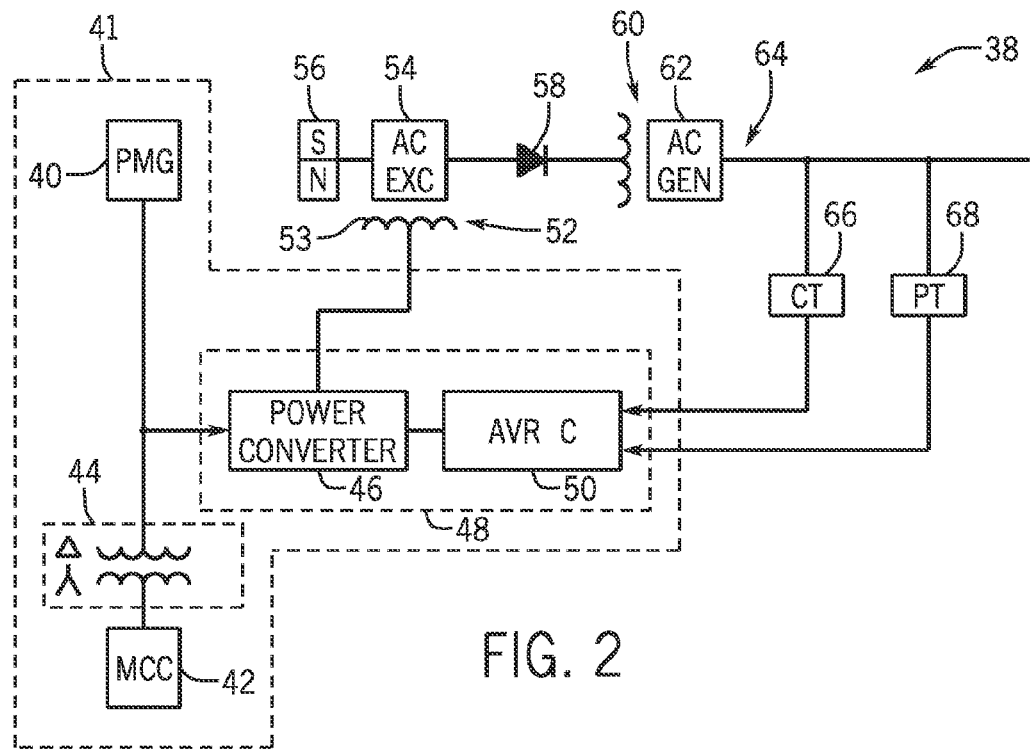
FIG. 2 is a block diagram of an alternating current (AC) power generating system for use in the system of FIG. 1, in accordance with an embodiment.

Turning now to FIG. 2, a block diagram of an AC power generating system 38 is illustrated. In some traditional operations, power generating systems have used a brushless permanent magnet generator (PMG) 40 as a standard excitation system for AC power generators. However, during grid events, the response time for the PMG 40 to stabilize the smart grid system 10 may be an important consideration for a grid operator. It may be appreciated that a grid event may include the addition of a new load to the smart grid system 10, a power surge into the smart grid system 10, a power outage in parts of the smart gird system 10, or any other occurrence at the electric grid that may affect an output of the AC power generating system 38. Additionally, there are typically no load rejection capabilities for a fault condition using a standard excitation system (e.g., the brushless PMG 40). However, the standard excitation system, inclusive of a brushless PMG 40, may be fault tolerant. Fault tolerance may be defined as an ability of the AC power generating system 38 to continue running despite slow response times by the standard excitation system during a fault condition (e.g., the grid events).

Other embodiments of the AC power generating system 38 may include the use of slip rings with the traditional brushless PMG 40. However, the use of the slip ring method may increase cost due to the need for a special generator and a special automatic voltage regulator. Moreover, the use of slip rings typically lacks fault tolerance capability. Nevertheless, the use of the slip rings in conjunction with a brushless PMG 40 allows for load rejection capabilities and is High Initial Response compliant. High Initial Response is an excitation system standard in which the excitation system is considered compliant under IEEE Standard 421.1 when the excitation system stabilizes in less than 100 ms.

In place of the traditional slip rings and the brushless PMG 40, a brushless PMG plus system 41 may be utilized. The brushless PMG plus system 41 may provide one or more of load rejection capabilities, a faster response time than using the standard PMG 40, High Initial Response compliance, fault tolerance, and/or a reduced cost from the slip rings discussed above. The brushless PMG plus system 41 is described in greater detail below.

To enhance the response time of the PMG 40 during grid events in the brushless PMG plus system 41, a second voltage source may be fed from a three-phase motor control center (MCC) 42 into an isolation power potential transformer (PPT) 44. By way of example, the PPT 44 may be a 7.5 kVA PPT in which a primary winding of the PPT 44 is fed from the MCC 42. It may be noted that voltage provided at an output of a secondary winding of the PPT 44 may provide a constant voltage source to the brushless PMG plus system 41. While the output of the PPT 44 may provide a primary voltage source for the PMG plus system 41, the PMG 40 may provide a supplemental voltage source to enhance a response time of the brushless PMG plus system 41 upon acceptance of a load. It may be noted that the supplemental voltage source (i.e., the PMG 40) may be capable of replacing the voltage output of the PPT 44 in an event that the MCC 42 fails. Further, the supplemental voltage may supply, for example, a constant voltage output in parallel to an output of the PPT 44 such that voltage from both the PMG 40 and voltage from the output of the PPT 44 are implemented simultaneously, for example, upon the occurrence of a grid event during which utilization of a single voltage source might lead to potential faults. Furthermore, the MCC 42 may output a three-phase AC voltage signal at approximately 50 Hz, and the PMG 40 may output a two-phase AC voltage signal at approximately 150 Hz. In this manner, the separate voltage sources may output voltage signals as different frequencies.

The AC power generating system 38 may utilize a sagging voltage of the PPT 44 resulting from a grid event together with the output of the PMG 40 to emulate a High Initial Response when a load acceptance from the smart grid system 10 (coupled to the AC power generating system 38) occurs. The High Initial Response may allow the brushless PMG plus system 41 to stabilize the smart grid 10 upon acceptance of a load within around 50 ms. In this manner, upon the load acceptance, a seamless transfer from the sagging voltage of the PPT 44 to a voltage provided during normal operation may occur. The seamless transfer may result in accelerated response times to the grid events.

In some embodiments, the isolation PPT 44 may be made up of a wye-to-delta transformer. The wye-to-delta transformer may have an advantage of harmonic voltages within the transformer self-canceling themselves in a delta-configured secondary winding of the isolation PPT 44. Canceling the harmonic voltages may enhance reliability of an excitation system (e.g. the brushless PMG plus system 41) and reduce equipment malfunctions resulting from electric noise. Further, the isolation PPT 44 may allow the MCC 42 to supply AC power to the excitation system, while maintaining isolation of the MCC 42 from the AC power generating system 38. Isolation of the MCC 42 from the AC power generating system 38 may be advantageous to prevent current flow between the two electrical systems 42 and 38.

Alternatively, the MCC 42 and the PPT 44 may be replaced by a DC battery source. That is, the MCC 42, the PPT 44, and any diode rectification of the AC voltage source may be removed when implementing the DC battery source to provide the voltage supply. The DC battery source may be used in a system where either the MCC 42 is not used or the MCC 42 is not convenient for the grid operator.

The output of the PMG 40 and the output of the PPT 44 may be fed in parallel into a power converter 46 of an automatic voltage regulator (AVR) 48. As discussed previously, the output of the PMG 40 may be provided in parallel to the output of the PPT 44 to supplement a sagging voltage output of the PPT 44 during acceptance of a load from the smart grid system 10. The power converter 46 may contain switches (e.g., integrated gate bipolar transistors (IGBTs)) that are controlled by an AVR controller 50. Further, the IGBTs, as described in more detail below, may provide fault control for the excitation system and voltage regulation for a voltage applied to an exciter field 52. The power converter 46 may also contain full-wave bridge rectifiers for both the output of the PMG 40 and the output of the PPT 44. The full-wave bridge rectifiers, as discussed in detail below, may convert AC power generated at the PMG 40 and provided by the MCC 42 to direct current (DC) outputs provided to the exciter field 52. Further, diodes within the full-wave bridge rectifiers may also provide a steering mechanism for the DC outputs so that the DC outputs are supplied to a DC bus of the exciter field 52, and so that the DC outputs are blocked from feeding into either the PMG 40 or the PPT 44.

Once the output of the PMG 40 and the output of the PPT 44 are rectified by the power converter 46, the DC outputs may be supplied to a coil 53 to produce the exciter field 52. The exciter field 52 may be a magnetic field that excites field coils of an AC exciter 54. After the field coils of the AC exciter 54 are excited, a rotating magnet 56 may produce an AC output from the AC exciter 54 that may then feed a rotating diode wheel 58. The rotating diode wheel 58 may rectify the AC output from the AC exciter 54 and produce a DC output that may enter a coil to produce a generator field 60. Further, the generator field 60 may rotate within an AC generator 62. The generator field 60 may provide a magnetic field proportional to a current through the coil of the generator field 60.

Additionally, the AC generator 62 may produce an AC output 64 proportional to the magnetic field of the generator field 60. Therefore, an increase in power at the AC output 64 may be accomplished by increasing the magnetic field of the generator field 60. Furthermore, the magnetic field of the generator field 60 may similarly be increased by increasing the magnetic field of the exciter field 52. Finally, the magnetic field of the exciter field 52 may vary based on the outputs supplied by the PMG 40 and the PPT 44.

With the foregoing in mind, a current transformer 66 and a potential transformer 68 may be placed at the output 64 of the AC generator 62. The current transformer 66 and the potential transformer 68 may provide current and voltage measurements to the AVR controller 50 to determine an amount of power output by the AC generator 62. The AVR controller 50 may then use the current and voltage measurements to adjust current entering the coil 53 of the exciter field 52 which may control the output 64 of the AC generator 62. When the current transformer 66 and the potential transformer 68 indicate a drop in power at the output 68, the output of the PMG 40 and the output of the PPT 44 may provide sufficient voltage at the coil 53 of the exciter field 52 to drive the power at the output 68 to an acceptable level in a manner that, for example, meets the requirements of the High Initial Response standard.

The example described above in relation to FIG. 2 describes an embodiment in which the MCC 42 provides the primary voltage source to the coil 53, and the PMG 40 provides the supplemental voltage source to the coil 53. It may be noted, however, that the brushless PMG plus system 41 may also be configured to operate with the PMG 40 functioning as the primary voltage source to the coil 53 and the MCC 42 functioning as the supplemental voltage source to the coil 53. In such an embodiment, the MCC 42 may provide supplemental voltage to supplement the lagging voltage output by the PMG 40 to the coil 53 upon experiencing a grid event in a manner similar to that described above. Accordingly, in some embodiments, either of the PMG 40 or the MCC 42 may operate as a sole voltage source, with the other source operating as an auxiliary or supplemental voltage source, for example, upon an occurrence of a grid destabilizing event or other power event, such as a load added to the grid system 10 for which the brushless PMG plus system 41 may not compensate.

Figure 3:
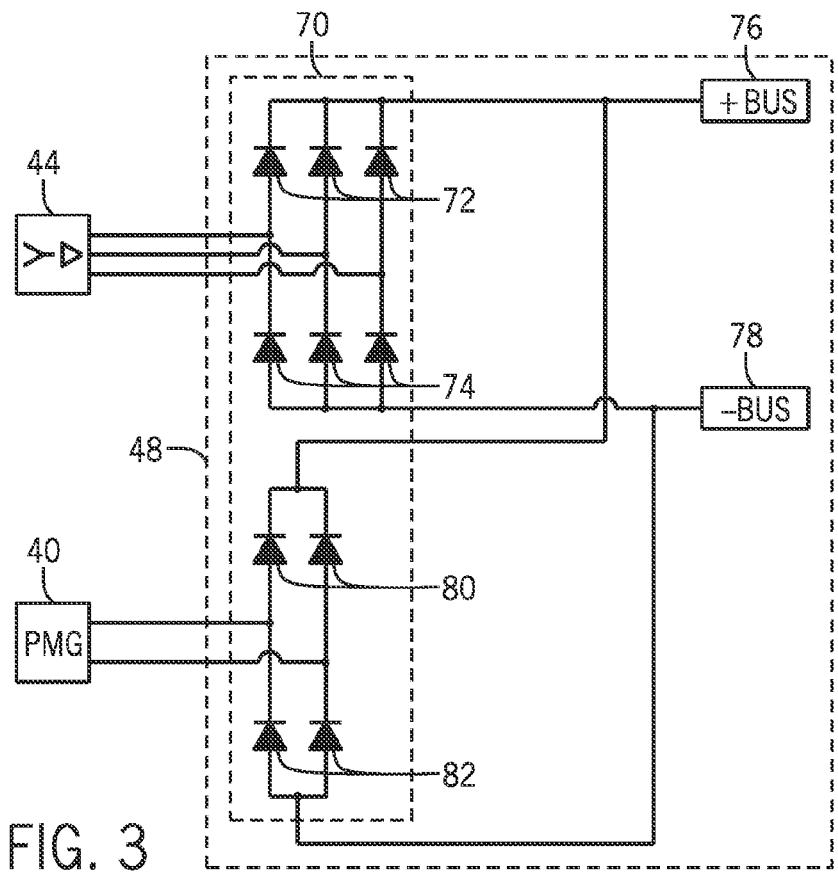
FIG. 3 is a block diagram of diode rectifiers of a power converter of the AC power generating system illustrated in FIG. 2, in accordance with an embodiment.

Turning to FIG. 3, a block diagram of diode rectifiers 70 within the power converter 46 is illustrated. As discussed above, the diode rectifiers 70 may convert AC inputs received by the diode rectifiers 70 into DC outputs from the diode rectifiers 70. The PPT 44 may input an AC signal to the diodes 72 and 74. The diodes 72 may be forward biased while the diodes 74 may be reverse biased to the direction of the AC inputs. For the forward biased diodes 72, a positive portion of an AC sine wave originating from the PPT 44 may pass to a positive bus 76 of the power converter 46. Further, the reverse biased diodes 74 may allow a negative portion of an AC sine wave originating from the PPT 44 to pass to a negative bus 78 of the power converter 46. The result may be a full-wave rectification of a three-phase AC signal from the PPT 44.

Additionally, forward biased diodes 80 and reverse biased diodes 82 may provide a full-wave rectification of the single phase AC output of the PMG 40. Similar to the diodes 72 and 74, the diodes 80 and 82 may output a rectified AC signal to the positive bus 76 and the negative bus 78. In some embodiments, additional components coupled to the positive bus 76 and the negative bus 78 may be utilized, as desired, to further condition the rectified outputs of both the PMG 40 and the PPT 44 to generate a signal that more closely represents a DC signal. Further, the DC signal may charge the coil 53 of the exciter field 52 to generate a desired magnetic field strength as merely applying AC signals to the coil 53 of the exciter field 52 may not excite the coil 53 to charge to a desired level.

Further, the diodes 72, 74, 80, and 82 may function to direct the power provided from the PPT 44 and the PMG 40 into the positive bus 76 and the negative bus 78. Furthermore, the diodes 72 and 74 may block power from the PMG 40 from feeding into the PPT 44. Likewise, the diodes 80 and 82 may block voltage from the PPT 44 from feeding into the PMG 40. Therefore, the diodes 72, 74, 80, and 82 may also function to limit any feedback into the PMG 40 or the PPT 44.

Moreover, in some embodiments, switches (not shown) may be utilized in conjunction with the diode rectifiers 70 to control the application of the voltage sources 40, 44 to the positive bus 76 and the negative bus 78. The switches may selectively apply the rectified AC signal from either or both of the PMG 40 and the output of the PPT 44 to the positive bus 76 and the negative bus 78. The AVR controller 50 may operate the switches to select the voltage source 40 or 44 that outputs the highest voltage supply during a grid event. Additionally, the switches may comprise transistors, or any other switching components, capable of accomplishing an appropriate switching function and controllable by the AVR controller 50.

Figure 4:
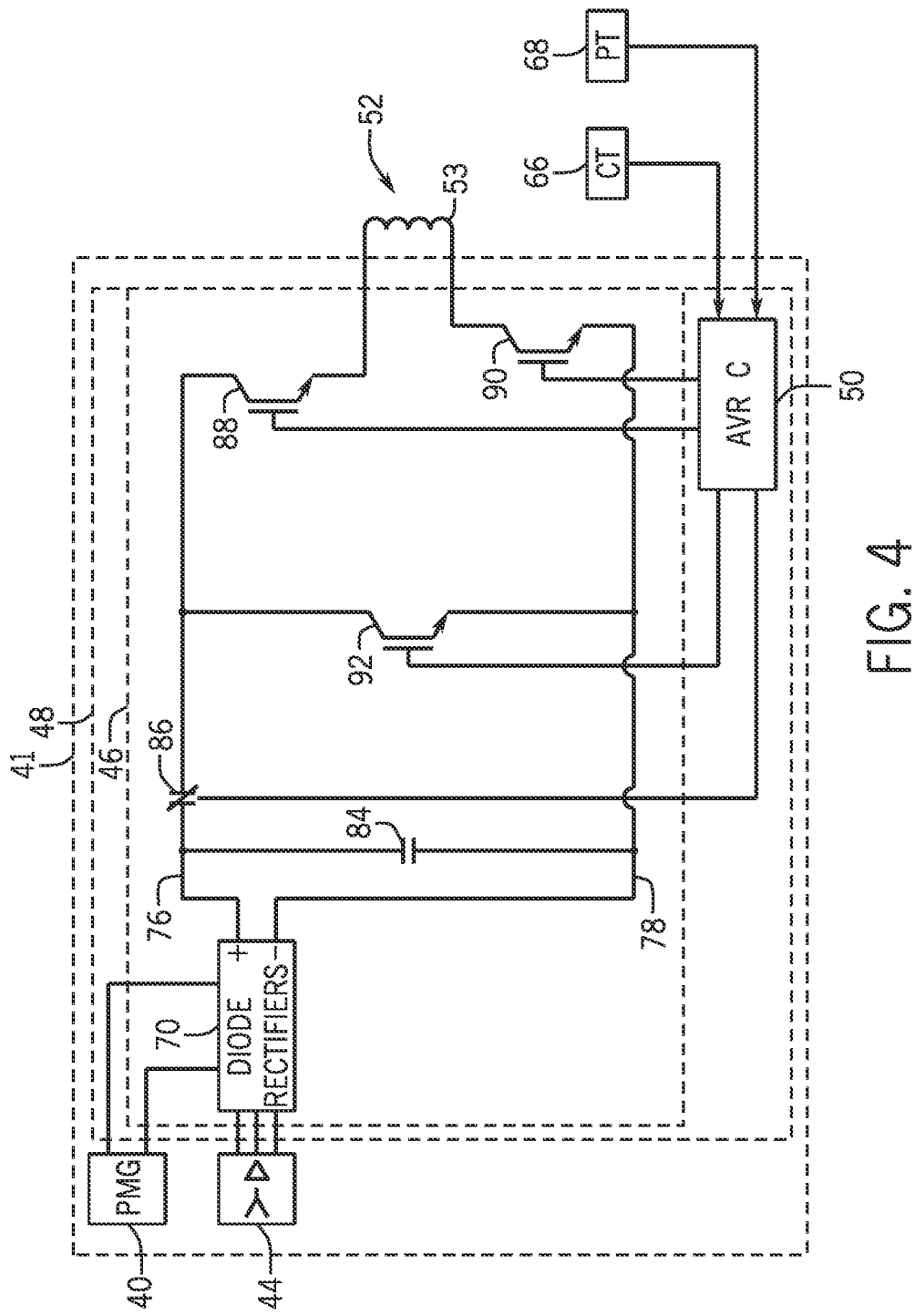
FIG. 4 is a block diagram of an automatic voltage regulator of the AC power generating system illustrated in FIG. 2, in accordance with an embodiment.

FIG. 4 is a block diagram of the AVR 48. As discussed above, the AVR 48 may control voltage applied to the coil 53 of the exciter field 52 based on power levels at the output 64 of the AC generator 62. As illustrated, the output of the diode rectifiers 70 to the positive bus 76 and the negative bus 78 may be coupled to the coil 53 of the exciter field 52. Upon the rectified AC signals entering a voltage control portion of the power converter 46 from the diode rectifiers 70, the AC signals may encounter a reservoir capacitor 84 coupled between the positive bus 76 and the negative bus 78. Additionally, in some embodiments, the reservoir capacitor 84 may function to smooth the rectified AC signals into a more continuous DC signal.

After the diode rectifiers 70 rectify the signal, the capacitor 84 may complete the conversion of the voltage outputs of the PMG 40 and the PPT 44 from an AC signal to a DC signal. Additionally, a contactor 86 may be positioned on the positive bus 76. The contactor 86 may be controlled by the AVR controller 50, and it may be signaled to open upon a signal into the AVR controller 50 indicating that an error has occurred and the system should shut down. For example, should a power outage occur on the smart grid system 10, the AVR controller 50 may receive a signal to open the contactor 86. When the contactor 86 is opened, the brushless PMG plus system 41 may cease to supply any further voltage to the coil 53 of the exciter field 52. Further, it may be noted that the contactor 86 generally remains in a closed position. Also, the contactor 86 may be instructed to open upon an indication of any other significant fault, such as a load added to the grid system 10 for which the brushless PMG plus system 41 may not compensate.

Further, IGBTs 88 and 90 may be controlled by the AVR controller 50 to control the magnetic field of the exciter field 52. As discussed above, the magnetic field of the exciter field 52 may be generated by a constant voltage level supplied at the coil 53 of the exciter field 52. Further, the exciter field 52 may excite the AC exciter 54 to a predetermined level while load values change to produce the output 64 of the AC generator 62. Therefore, the voltage provided at the coil 53 of the exciter field 52 may control the magnitude of the exciter field 52. Engaging and disengaging the voltage supplied at the coil 53 of the exciter field 52 may allow the AVR controller 50 to maintain the magnetic field of the exciter field 52 at a desired level. Moreover, the IGBTs 88 and 90 may be controlled based on measurements of the AC generator output 64 provided by the current transformer 66 and the potential transformer 68. For example, upon a signal indicating that the current or voltage generated by the AC generator 62 may be lagging, the AVR controller 50 may instruct the IGBTs 88 and 90 to remain active to increase strength of the magnetic field of the exciter field 52. An increase in the magnitude of the exciter field 52 may increase a magnitude of the magnetic field of the generating field 60 and may result in an increase in power production by the AC generator 62.

Furthermore, the PPT 44 may function as an auxiliary power supply for the exciter field 52. A rate of a rise of current (di/dt) in the coil 53 of the exciter field 52 may be a direct function of the voltage output of the PMG 40. During a grid event, or during initial loading of the smart grid 10, the output voltage of the PMG 40 may decrease as much as 40% before the output voltage returns to a level equivalent to a level prior to the grid event or the loading of the smart grid 10. During such an event, the PPT 44 may provide an auxiliary voltage source to compensate for the reduced output voltage of the PMG 40. The additional voltage supplied by the PPT 44 may provide an adequate voltage for the coil 53 of the exciter field 52 to produce a constant magnetic field during load acceptance. Further, the di/dt in the coil 53 of the exciter field 52 may be greater with additional voltage provided from the PPT 44. In general, the higher the voltage supplied at the coil 53 of the exciter field 52, the faster the di/dt may rise.

Additionally, IGBT 92 may provide a mechanism for load rejection. Upon a signal to the AVR controller 50 indicating a serious fault condition during power generation at the AC generator 62, instead of opening the contactor 86, the IGBT 92 may first be activated creating a short from the positive bus 76 to the negative bus 78. The short may allow the horsepower of the AC generator 62 decrease to zero before opening the contactor 86. Therefore, the AVR controller 50 may be programmed to create the short at IGBT 92 and then wait for a pre-programmed amount of time before opening the contactor 86. For example, the short across IGBT 92 may allow the coil 53 of the exciter field 52 to discharge for 50 ms resulting in reduced horsepower in the AC generator 62. After 50 ms, the coil 53 of the exciter field 52 may have been discharged for 50 ms, and the contactor 86 may be opened by AVR controller 50 disengaging the power supply of the PMG 40 and the PPT 44 from the coil 53 of the exciter field 52.

Technical effects of the disclosure include enhanced load acceptance and rejection characteristics of a constant potential excitation system for the exciter field 52. The constant potential excitation system may enhance load acceptance characteristics by incorporating the PPT 44 as an auxiliary voltage source into the constant potential excitation system and improving High Initial Response upon load acceptance. Further, the load rejection characteristics of the constant potential excitation system may provide a controlled load rejection using the AVR controller 50, the contactor 86, and the IGBT 92 in the manner discussed above.

This written description uses examples to disclose the subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. An alternating current power generation system, the system comprising:
   an alternating current generator comprising an exciter;
   a brushless permanent magnet generator voltage source configured to generate a first voltage at a first frequency;
   a second voltage source configured to generate a second voltage at a second frequency;
   an automatic voltage regulator configured to receive the first voltage and the second voltage; and
   a coil, wherein the brushless permanent magnet generator voltage source provides the first voltage as a supplemental voltage supply combined with the second voltage at the coil to generate a constant exciter field received by the exciter of the alternating current generator.

2. The system of claim 1, wherein the second voltage source supplies a three-phase alternating current voltage as a primary voltage supply.

3. The system of claim 2, comprising a first full-wave bridge rectifier coupled to a direct current bus, wherein the first full-wave bridge rectifier receives an output of the brushless permanent magnet generator voltage source and a second full-wave bridge rectifier coupled to the direct current bus, wherein the second full-wave bridge rectifier receives an output of the second voltage source.

4. The system of claim 3, wherein the first full-wave bridge rectifier and the second full-wave bridge rectifier comprise a blocking mechanism to prevent back feeding voltage into both the brushless permanent magnet generator voltage source and the second voltage source.

5. The system of claim 2, comprising an isolation power potential transformer, wherein the supplemental voltage supply is provided to an input of the isolation power potential transformer, and the isolation power potential transformer generates an isolated three-phase alternating current voltage signal that is isolated from the second voltage source and supplements the output of the brushless permanent magnet generator voltage source.

6. The system of claim 1, wherein the second voltage source is a direct current battery source and the second voltage source supplies a direct current voltage at the coil.

7. The system of claim 1, wherein the supplemental voltage supply provides a voltage to mitigate a voltage drop at the output of the second voltage source within approximately 50 ms upon acceptance of a load on a grid coupled to the alternating current power generation system.

8. The system of claim 1, wherein the brushless permanent magnet generator generates the first voltage at approximately 150 Hz, and the second voltage source generates the second voltage at approximately 50 Hz.

9. The system of claim 1, wherein the automatic voltage regulator comprises one or more full-wave bridge rectifiers and an automatic voltage regulator controller, wherein the automatic voltage regulator controls voltage application to a coil of the constant exciter field to vary a magnitude of the constant exciter field.

10. The system of claim 9, wherein the automatic voltage regulator controls the voltage application to the coil of the constant exciter field based on a voltage level and a current level of an output of the alternating current generator.

11. A device comprising:
an automatic voltage regulator, wherein the automatic voltage regulator controls voltage entering a coil of an exciter field, wherein the automatic voltage regulator comprises:
   a power converter configured to:
      rectify voltage inputs received from a permanent magnet generator and a second voltage source at differing frequencies; and
      supply a voltage to a direct current bus; and
   an automatic voltage regulator controller configured to:
      receive data from an output of an alternating current generator; and
      control application of the voltage at the direct current bus to the coil of the exciter field based on the data received from the output of the alternating current generator.

12. The device of claim 11, wherein the power converter comprises a rectifier that rectifies received voltage inputs.

13. The device of claim 12, wherein the rectifier comprises at least one full-wave bridge rectifier.

14. The device of claim 11, comprising one or more transistors, wherein the automatic voltage regulator controller supplies signals to the one or more transistors along the direct current bus to control the voltage applied to the coil of the exciter field.

15. The device of claim 11, wherein the power converter comprises a full-wave bridge rectifier to rectify the voltage input from the permanent magnet generator.

16. A method for controlling an output of an alternating current generator, the method comprising:
receiving voltage from a brushless permanent magnet generator and a second voltage source at an automatic voltage regulator, wherein the voltage received from the brushless permanent magnet generator comprises a different frequency than the voltage received from the second voltage source;
receiving signals indicating a current level and a voltage level of the output of the alternating current generator at the automatic voltage regulator; and
controlling an application of the voltage from the brushless permanent magnet generator and the second voltage source at a coil of an exciter field to vary a magnitude of the exciter field, wherein the exciter field excites an alternating current exciter within the alternating current generator, the alternating current exciter controls a generating field of the alternating current generator, and the generating field controls the output of the alternating current generator.

17. The method of claim 16, further comprising rectifying the voltage received from the permanent magnet generator and the second voltage source via two full-wave bridge rectifiers.

18. The method of claim 16, wherein supplying signals for the automatic voltage regulator to one or more transistors positioned on a circuit containing the coil of the exciter field controls the application of the voltage from the brushless permanent magnet generator and the second voltage source at the coil of the exciter field.

19. The method of claim 18, wherein the signals indicating the current level and the voltage level of the output of the alternating current generator provide values used to control the transistors.

20. The method of claim 16, wherein receiving voltage from the second voltage source comprises receiving an isolated three-phase voltage signal that is isolated from the second voltage source via an isolation power potential transformer.

* * * * *